(12) United States Patent
Seo

(10) Patent No.: US 10,034,084 B2
(45) Date of Patent: Jul. 24, 2018

(54) VOICE SIGNAL EXTRACTION AND INPUT APPARATUS FOR SMART DEVICE

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 0 days.

(21) Appl. No.: 15/203,289

(22) Filed: Jul. 6, 2016

(65) Prior Publication Data

US 2017/0013356 A1   Jan. 12, 2017

(30) Foreign Application Priority Data

Jul. 7, 2015 (KR) ........................ 10-2015-0096407

(51) Int. Cl.
| | |
|---|---|
| *H04R 1/10* | (2006.01) |
| *H04R 3/00* | (2006.01) |
| *H04R 1/08* | (2006.01) |
| *H04M 1/60* | (2006.01) |
| *H04R 3/12* | (2006.01) |
| *H04M 1/58* | (2006.01) |
| *H04M 9/08* | (2006.01) |

(52) U.S. Cl.
CPC ............... *H04R 3/00* (2013.01); *H04R 1/08* (2013.01); *H04R 1/1016* (2013.01); *H04R 1/1033* (2013.01); *H04R 1/1041* (2013.01); *H04M 1/585* (2013.01); *H04M 1/6008* (2013.01); *H04M 9/08* (2013.01); *H04R 1/10* (2013.01); *H04R 3/12* (2013.01); *H04R 2499/11* (2013.01)

(58) Field of Classification Search
CPC ...... H04R 1/1041; H04R 1/10; H04R 1/1033; H04M 1/585; H04M 1/6008

USPC .......................................................... 381/74
See application file for complete search history.

(56) References Cited

U.S. PATENT DOCUMENTS

| | | | | |
|---|---|---|---|---|
| 2005/0047620 | A1* | 3/2005 | Fretz .................... | H04R 25/453 381/318 |
| 2005/0130711 | A1* | 6/2005 | Kang .................... | H04M 9/082 455/570 |
| 2008/0240413 | A1* | 10/2008 | Mohammad .......... | H04M 9/082 379/406.08 |

(Continued)

FOREIGN PATENT DOCUMENTS

KR   10-2014-0097085 A   8/2014

*Primary Examiner* — Vivian Chin
*Assistant Examiner* — Ubachukwu Odunukwe
(74) *Attorney, Agent, or Firm* — Mintz Levin Cohn Ferris Glovsky and Popeo, P.C.; Kongsik Kim; Jhongwoo Peck

(57) ABSTRACT

A voice signal processing device connected to a smart device is provided. The voice signal processing device is connected to a smart phone, a tablet computer or the like and includes a voice signal input and output function mounted thereon. The voice signal processing device returns a sound generated by the smart device or a sound generated from the exterior into the smart device as a high-quality sound and is configured to extract a voice signal from a wire coupled to the smart device and the ear receiver and configured to input the extracted voice signal into the input terminal of the microphone of the smart device. A voice signal output from the smart device is configured to be extracted and conveniently input into the smart device and loss and distortion is minimized in the process of extracting and returning the voice signal.

5 Claims, 6 Drawing Sheets

(56) References Cited

U.S. PATENT DOCUMENTS

2012/0321097 A1* 12/2012 Braho ................. H04R 1/10
                                                        381/74

* cited by examiner

VOICE SIGNAL EXTRACTION AND INPUT APPARATUS FOR SMART DEVICE

CROSS-REFERENCE TO RELATED APPLICATIONS

This application claims priority to Korean Application No. 10-2015-0096407 filed on Jul. 7, 2015, which is incorporated herein by reference.

BACKGROUND (a) Field of the Invention

The present invention relates to a voice signal processing device connected to a smart device and more particularly to a smart phone, a tablet computer that has a voice signal input and output function mounted thereon, that returns a sound generated by the smart device or a sound generated in the exterior, into the smart device as a high-quality sound by extracting a voice signal from a wire connecting the smart device 10 and the ear receiver 21 and inputting the extracted voice signal into the input terminal 12 of the microphone 22 of the smart device 10.

(b) Description of the Related Art

Generally, a smart device 10 such as a smart phone, a tablet computer or the like that utilize a multi-function information device include high performance processing unit, a large capacity memory unit and a high resolution touch screen are mounted to perform a variety of application programs, rather than being used as a simple communication device. In other words, the smart device 10 overcomes the temporal and spatial constraints in using an information device by minimizing power consumption and maximizing portability through miniaturization and reduction of weight, and the miniaturization and reduction of weight are accomplished by applying an integrated input and output device having combined input and output functions. For example, a touch screen of the smart devices 10, and integration of the processing unit and the memory unit are typically embedded in the smart device 10.

Currently, smart devices 10 have performance comparable to those of general desktop computers in processing speed. Since an application program performing various functions such a game, a multimedia information processing function and the like is executed according thereto, a function of inputting and outputting a high-quality voice signal is also included. Although input and output of a voice signal of the smart device 10 can be performed through a built-in speaker and a built-in microphone, a voice input and output device can be omitted. Alternately, the output power can be insufficient based on the miniaturization and weight reduction of the smart device 10 described above. Accordingly, a detachable device such an earphone as shown in FIG. 1 is utilized.

In a conventional voice signal input and output device for a smart device 10, a structure of configuring an earphone jack 23 at an end of a wire to which an ear receive 21 and a microphone 22 are connected are in FIG. 1 and are combined with the smart device 10 such as a smart phone or the like. In other words a structure of driving the ear receiver 21 using a voice signal output from the smart device 10 and inputting a voice signal generated by the microphone 22 into the smart device 10, and although the ear receiver 21 and the microphone 22 are integrated by appearance, they respectively have independent structures in an electrical behavior.

Accordingly, in a conventional earphone mounting a microphone 22 as shown in FIG. 1, the ear receiver 21 outputs a voice signal transmitted from the smart device 10, and the microphone 22 inputs a sound generated from the exterior into the smart device 10, and thus any type of interaction cannot be expected at all between the voice output signal and the input signal of the smart device 10. Individual processing of the output voice signal and the input voice signal necessarily invites limitation in utilizing the smart device 10, and, for example, there must be a constraint in the process of minimizing loss and distortion of a sound output from the smart device 10 and recording the sound or adding the sound to a recorded video.

In particular, when a situation of recording a sound generated by the smart device 10 into the same smart device 10 is assumed, a sound output from a built-in speaker or the ear receiver 21 and propagates in the air and is recorded in a method of inputting the sound into a built-in microphone or the microphone 22 mounting an earphone. The volume and quality must be degraded. Particularly, when a user executes a moving image capture application program while playing a game using the smart device 10 and records a game screen together with a sound or plays back a music file recorded in the smart device 10 while photographing a moving image using the smart device 10 and inserts the music as background music, this function cannot be sufficiently utilized with all the superior voice input and out and voice processing performance of the smart device 10 itself and does not meet the expectation of the user.

The above information disclosed in this section is merely for enhancement of understanding of the background of the invention and therefore it may contain information that does not form the prior art that is already known in this country to a person of ordinary skill in the art.

SUMMARY

A conventional voice signal input and output device for a smart device 10, has a structure of configuring an earphone jack 23 at an end of a wire to which an ear receive 21 and a microphone 22 are connected as shown in FIG. 1 and being combined with the smart device 10 such as a smart phone or the like.

In one aspect of the present invention, a voice signal processing device connected to a smart device 10 is provided. The voice signal processing device coupled to the smart device 10 may include an output terminal 11 configured to output a voice signal and an input terminal 12 for configured to input a voice signal. The voice signal extraction and input device for the smart device may include a main body 30 disposed on a wire that couples the output terminal 11 and the input terminal 12 of the smart device 10 to an ear receiver 21 and a microphone 22. A wire that couples the output terminal 11 of the smart device 10 to the ear receiver 21 and a wire that couples the input terminal 12 of the smart device 10 to the microphone 22 may be coupled to each other within the interior of the main body 30 through a connection unit 31. The voice signal output from the output terminal 11 may be configured to be extracted through the connection unit 31 and may be configured to flow into the wire that connects the microphone 22 and the input terminal 12 and may be input into the input terminal 12.

Additionally an extracted signal control unit 35 may be disposed within the connection unit 31 to transform the extracted voice signal. An integrated speaker 36 may be connected to the output terminal 11 of the smart device 10 and may be disposed within in the main body 30.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

The detailed configuration and operating principles of the present invention will be described below with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in networked computer systems so that the computer readable media is stored and executed in a distributed fashion, e.g., by a telematics server or a Controller Area Network (CAN).

Figure 1:
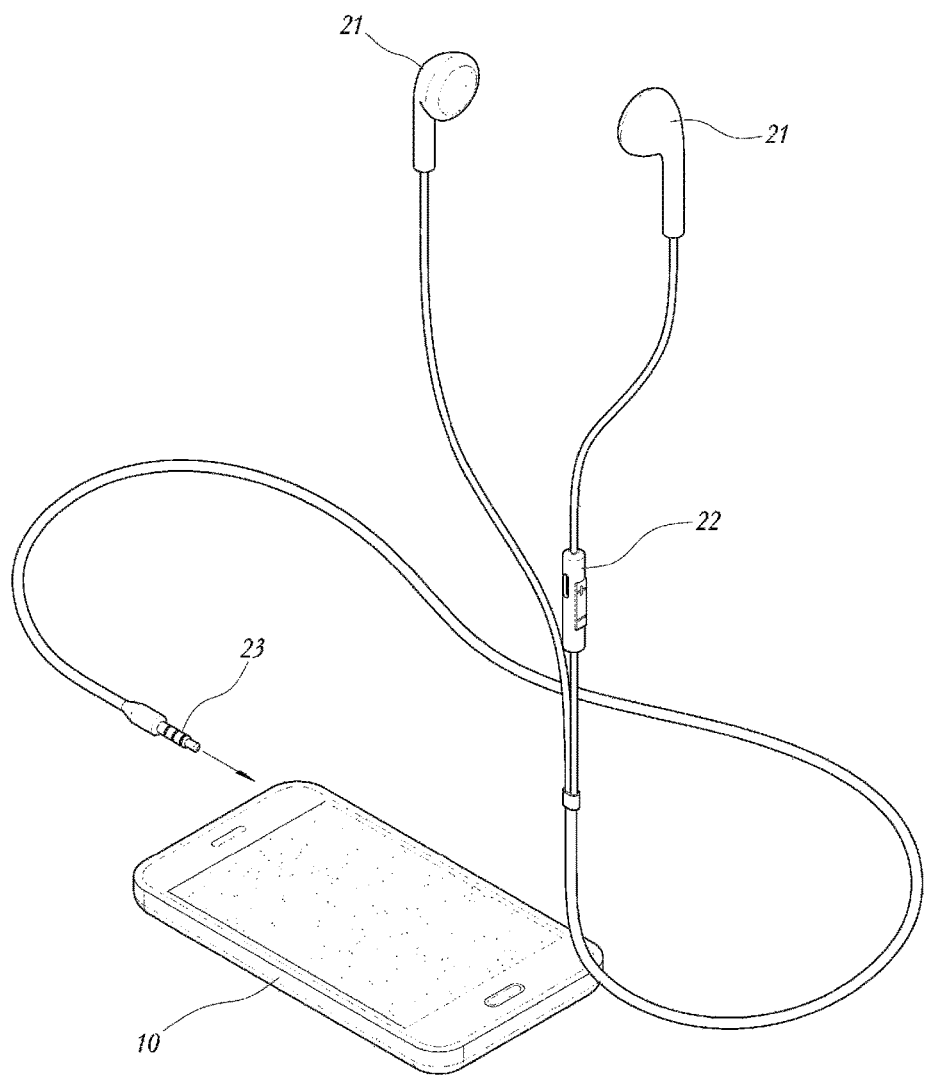
FIG. 1 is an exemplary perspective view showing a conventional earphone for a smart phone.
Figure 2:
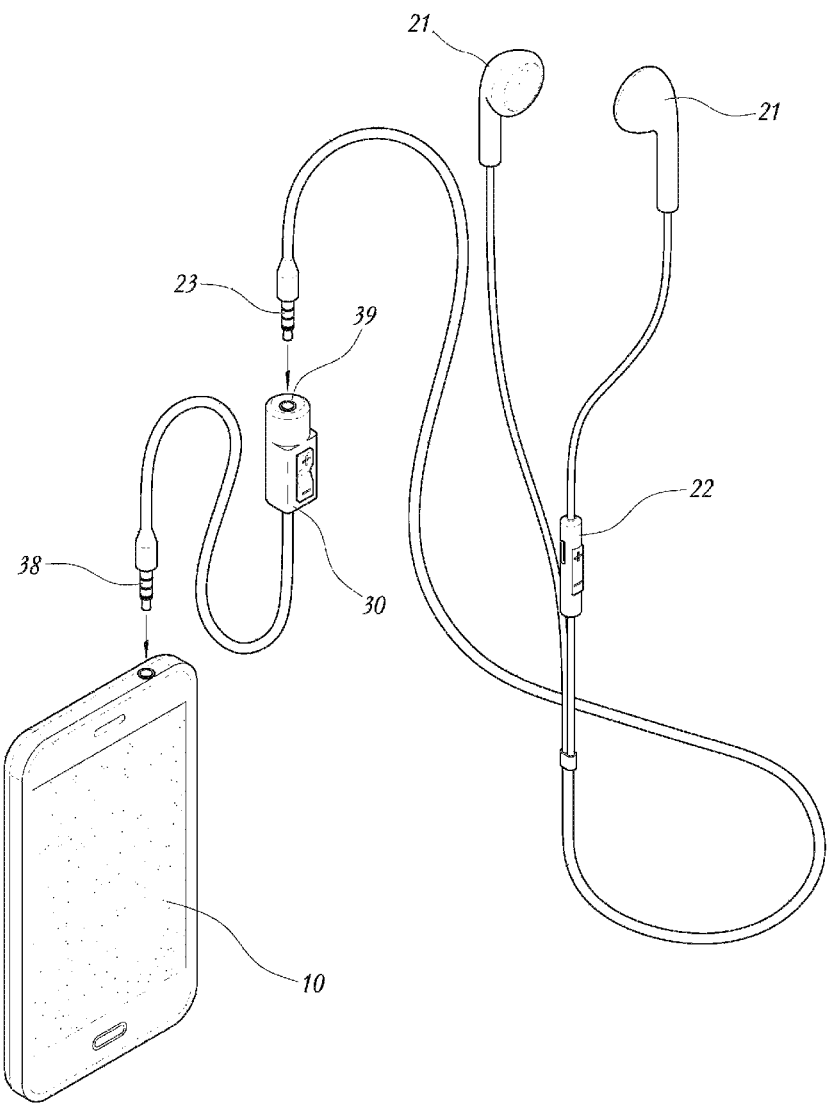
FIG. 2 is an exemplary perspective view according to an exemplary embodiment of the present invention.

As shown, FIG. 2 illustrates an exemplary view of the appearance and a use state of an earphone. The earphone may include a connection jack 38 combined with a smart phone 10, a main body 30, and a voice input and output device (e.g., a general earphone mounting) a microphone 22 that may be combined with the main body 30. In the exemplary embodiment shown in FIG. 2, a wire may extend from the bottom of the main body 30 and the connection jack 38 may be coupled at an end of the wire and combined with the smart device 10 and a jack coupling aperture 39 may be formed on the top of the main body 30 and an earphone jack 23 of the earphone may be coupled to the jack coupling aperture 39 formed on the top of the main body 30.

Figure 3:
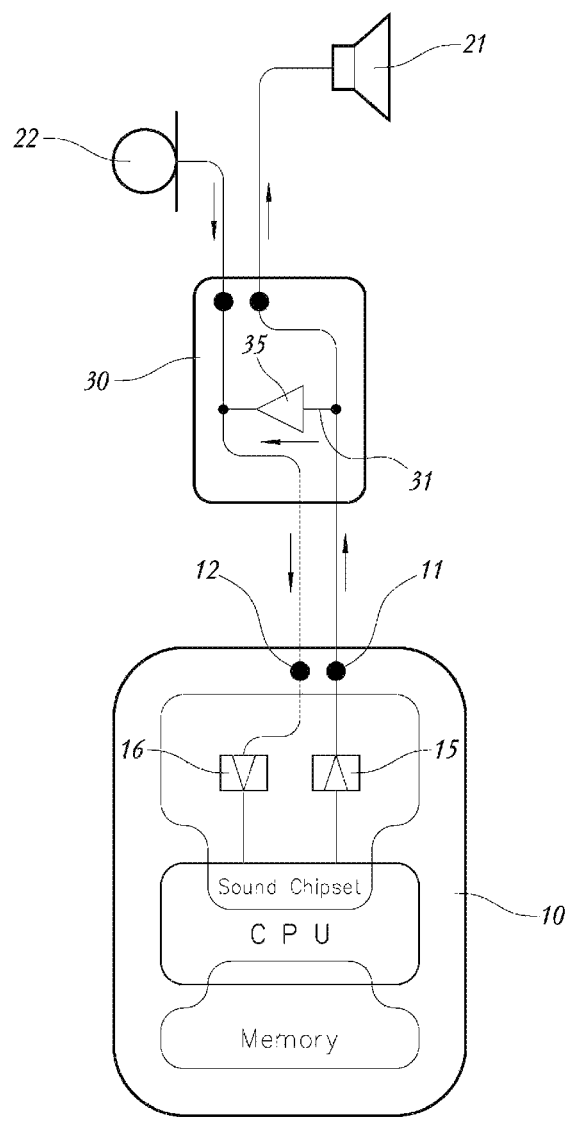
FIG. 3 is an exemplary configuration view according to an exemplary embodiment of the present invention.

FIG. 3 is an exemplary view showing the structure and an electrical connection of the present invention. As shown in the figure, the present invention relates to a voice signal processing device connected to the smart device 10 coupled to an output terminal 11 configured to output a voice signal and an input terminal 12 configured to input a voice signal and installed on a wire that couples the smart device 10 to the ear receiver 21 and the microphone 22. As shown in FIG. 3, the main body 30 may be disposed on a wire that couples the output terminal 11 and the input terminal 12 of the smart device 10 to the ear receiver 21 and the microphone 22. A wire may couple the output terminal 11 of the smart device 10 to the ear receiver 21 and a wire that couples the input terminal 12 of the smart device 10 to the microphone 22 may be coupled to each other within the interior of the main body 30 through a connection unit 31.

In particular, the voice signal output from the output terminal 11 connected to an output signal processing unit 15 of a sound chipset embedded in the smart device 10 to the ear receiver 21 may be configured to be transmitted through the wire and the voice signal may be extracted through the connection unit 31 embedded in the main body 30 and may be configured to flow into the wire that couples the microphone 22 and the input terminal 12. The extracted voice signal may be configured to flow into the wire input into the input terminal 12 coupled to an input signal processing unit 16 of the sound chipset embedded in the smart device 10. In other words, the voice signal generated by the output signal processing unit 15 of the sound chipset embedded in the smart device 10 is not output from a built-in speaker or the ear receiver 21 and is not input into the microphone 22 through propagation of the voice signal in the air or physical vibration of the smart device 10. However, the voice signal output from the output terminal 11 may be configured to be directly and electrically input into the input terminal 12 of the smart device 10 via the connection unit 31 without physical propagation, loss and distortion of the sound may be effectively suppressed.

In addition, as shown in FIG. 3, an extracted signal control unit 35 may include the connection unit 31 of the main body 30 configured to control the voice signal extracted from the wire connecting the output terminal 11. The extracted signal control unit 35 may include a circuit configured to process a voice signal. For example the connection unit 31 may be configured to increase or decrease the voice signal to a proper output level or may be configured to extract noise during the input of the voice signal output from the output terminal 11 into the input terminal 12. Particularly, as shown in FIG. 2, a user's intention may be effectively reflected in extracting and inputting a voice signal by configuring a handling button capable of user handling. For example, as volume control may be disposed in the main body 30 and may be configured to connect the handling button to the extracted signal control unit 35.

Figure 4:
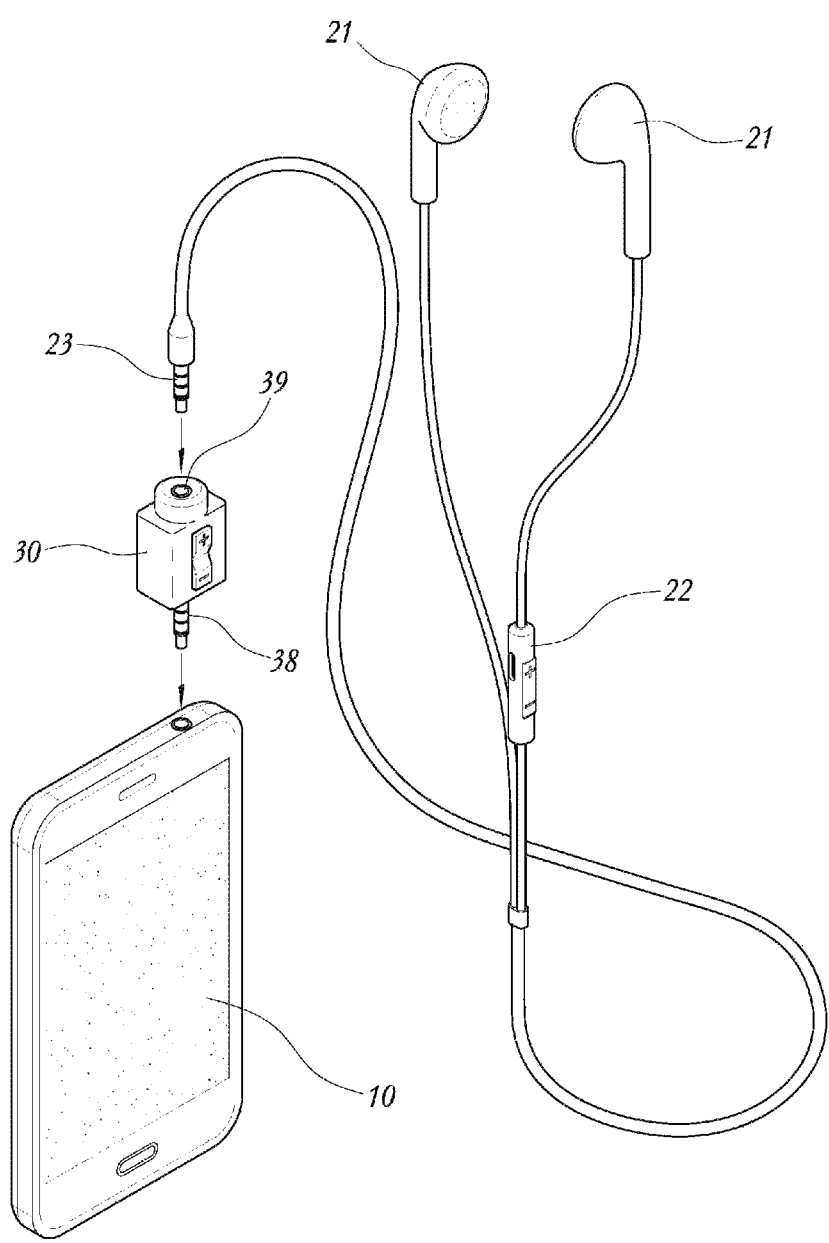
FIG. 4 is an exemplary perspective view showing a modified embodiment according to an exemplary embodiment of the present invention.
Figure 5:
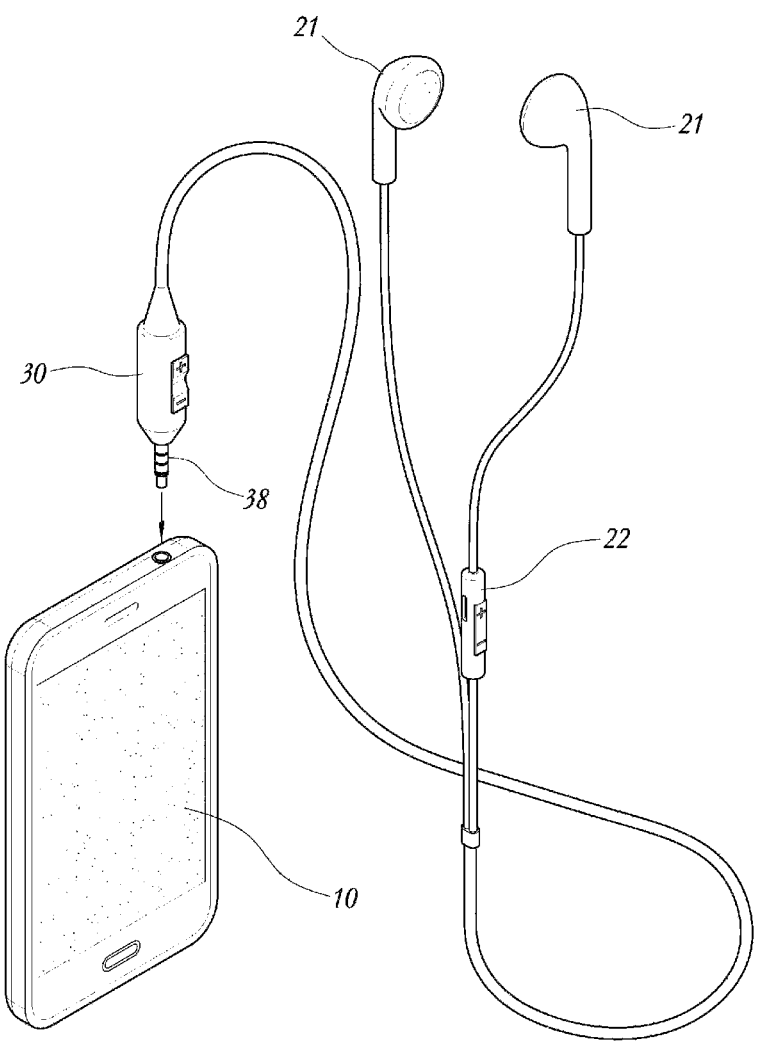
FIG. 5 is an exemplary perspective view showing an integrated earphone according to an exemplary embodiment of the present invention.

Furthermore, FIGS. 4 and 5 are exemplary views respectively showing an exemplary embodiment that directly couples the connection jack 38 to the main body 30 and an exemplary embodiment that couples the main body 30 and the earphone. Additionally, as shown in the figures, the configuration and connection method of the main body 30 may be diversely modified. As shown in FIGS. 2 and 4, although a jack coupling aperture 39 may be formed in the main body 30 of the present invention and a separate earphone may be combined. Further extraction and return of a voice signal through the exemplary embodiment may be performed regardless of connection of the earphone.

Figure 6:
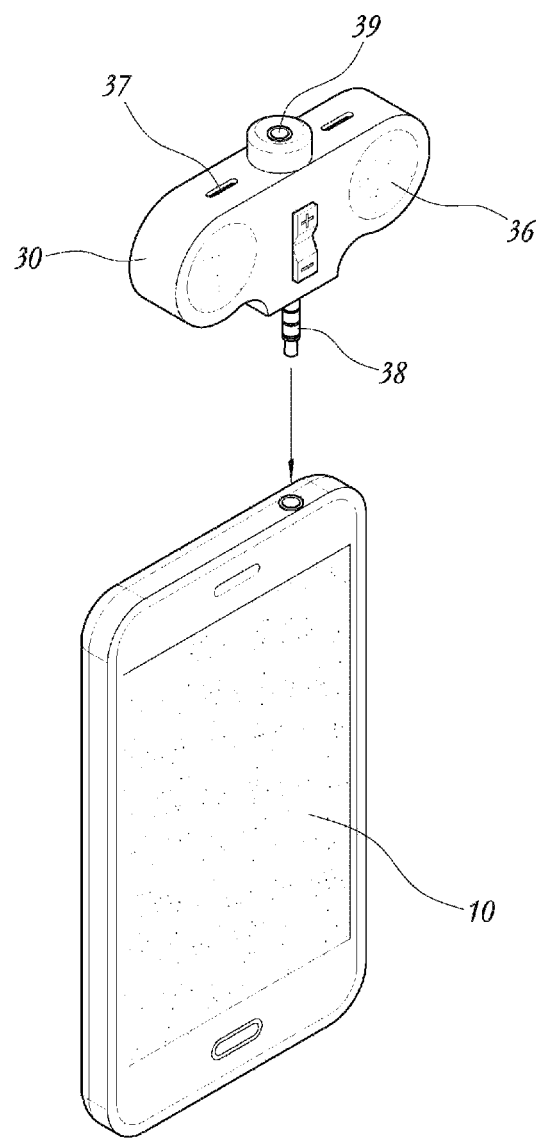
FIG. 6 is an exemplary perspective view showing an earphone embedded with a speaker and a microphone according to an exemplary embodiment of the present invention.

As shown in FIG. 6, in an exemplary embodiment, the main body 30 may be independently used without combination of a separate earphone. In other words since an integrated speaker 36 connected to the output terminal 11 of the smart device 10 may be disposed within the interior of the main body 30, a user may hear a sound output from the smart device 10 without an earphone. Additionally, as shown in FIG. 6, since an integrated microphone 37, as well as the integrated speaker 36, may also be disposed within the interior of the main body, an external sound may be input into the smart phone 10 without combination of a separate microphone or an earphone mounting a microphone. Through the present invention, a voice signal output from the smart device 10 may be extracted and input into the smart device 10, and loss and distortion may be reduced when the voice signal is extracted and returned. Particularly, since a sound output from the smart device 10 may be freely utilized as an input sound when a a voice or a video is recorded through the smart device 10 and user's convenience and utilization of the smart device 10 may be enhanced.

Hereinabove, although the present disclosure has been described with reference to exemplary embodiments and the accompanying drawings, the present disclosure is not limited to the disclosed embodiments. On the contrary, it is intended to cover, various modifications and equivalents arrangements altered by those skilled in the art to which the present disclosure pertains without departing from the spirit and scope of the present disclosure claimed in the following claims. The present invention provides for simultaneous connections of more than 500,000 global users within cloud grid system for the purpose of providing internet of things (IoT) platform service for web connectivity device.

What is claimed is:

1. A voice signal processing device connected to a smart device having an output terminal and an input terminal, comprising:
   a main body disposed between the smart device and an ear receiver and a microphone;
   a first wire that couples the output terminal of the smart device to the ear receiver; and
   a second wire that couples the input terminal of the smart device to the microphone,
   wherein the first wire and the second wire are coupled to each other within the interior of the main body through an amplifier disposed within the main body to adjust a voice signal from the first wire and feed into the second wire.

2. The device according to claim 1, wherein a coupling aperture is disposed on an end of the main body.

3. The device according to claim 1, wherein a sound chipset having an output signal processor and an input signal processor is disposed within the main body.

4. The device according to claim 1 wherein a speaker and a microphone are integrated into the main body.

5. The device according to claim 1, wherein the main body includes a volume control.

* * * * *